(12) United States Patent
Crowther

(10) Patent No.: US 7,995,218 B2
(45) Date of Patent: Aug. 9, 2011

(54) SENSOR SYSTEM AND REVERSE CLAMPING MECHANISM

(75) Inventor: David Crowther, Bloomfield Township, MI (US)

(73) Assignee: Perceptron, Inc., Plymouth, MI (US)

( * ) Notice: Subject to any disclaimer, the term of this patent is extended or adjusted under 35 U.S.C. 154(b) by 0 days.

(21) Appl. No.: 12/796,233

(22) Filed: Jun. 8, 2010

(65) Prior Publication Data
US 2010/0309483 A1     Dec. 9, 2010

Related U.S. Application Data

(63) Continuation-in-part of application No. 12/474,911, filed on May 29, 2009.

(51) Int. Cl.
*G01B 11/14*  (2006.01)
(52) U.S. Cl. .......... 356/620; 356/606; 356/623
(58) Field of Classification Search .......... 356/614–636, 356/3.01, 606; 250/559.2, 548; 382/203–26, 382/151, 154; 703/7; 24/455; 29/592
See application file for complete search history.

(56) References Cited

U.S. PATENT DOCUMENTS

| | | | | |
|---|---|---|---|---|
| 4,846,577 A | * | 7/1989 | Grindon | 356/610 |
| 5,175,601 A | * | 12/1992 | Fitts | 356/604 |
| 5,218,427 A | * | 6/1993 | Koch | 356/602 |
| 5,615,003 A | | 3/1997 | Hermary et al. | |
| 5,680,215 A | * | 10/1997 | Huber et al. | 356/600 |
| 5,870,220 A | * | 2/1999 | Migdal et al. | 359/216.1 |
| 6,492,651 B2 | * | 12/2002 | Kerekes | 250/559.2 |
| 6,542,246 B1 | * | 4/2003 | Toida | 356/484 |
| 6,760,116 B2 | * | 7/2004 | Iwasaki | 356/601 |
| 6,788,210 B1 | * | 9/2004 | Huang et al. | 340/612 |
| 7,286,223 B2 | * | 10/2007 | Denney et al. | 356/318 |
| 7,286,246 B2 | * | 10/2007 | Yoshida | 356/605 |
| 7,379,193 B2 | * | 5/2008 | Liu | 356/603 |
| 7,595,892 B2 | * | 9/2009 | Judell et al. | 356/511 |
| 7,719,672 B2 | * | 5/2010 | Kohayase et al. | 356/237.2 |
| 2005/0231734 A1 | | 10/2005 | Johannesson et al. | |
| 2007/0124949 A1 | | 6/2007 | Burns, Jr. et al. | |
| 2008/0273194 A1 | | 11/2008 | De Sloovere et al. | |

FOREIGN PATENT DOCUMENTS

| | | |
|---|---|---|
| EP | 1 906 139 A1 | 4/2008 |
| JP | 61 025003 A | 2/1986 |
| WO | WO 94/16290 A1 | 7/1994 |
| WO | WO 2009/120073 A2 | 10/2009 |
| WO | WO 2010/034301 A2 | 4/2010 |
| WO | WO 2010/138543 A1 | 12/2010 |

OTHER PUBLICATIONS

International Search Report for Application No. PCT/US2010/036136 Dated Oct. 18, 2010.
Simon Winkelbach et al., "Low-Cost Laser Range Scanner and Fast Surface Registration Approach", Jan. 1, 2006, Pattern Recognition: 28th Dagm Symposium, Berlin, Germany, Sep. 12-14, 2006; Proceedings; Lecture Notes In Computer Science, Springer, Berlin, DE, pp. 718-728.
Notice of Allowance for U.S. Appl. No. 12/474,911 Dated Jun. 2, 2011.

\* cited by examiner

*Primary Examiner* — Sang Nguyen
(74) *Attorney, Agent, or Firm* — Brinks Hofer Gilson & Lione

(57) ABSTRACT

A sensor system and a reverse clamp is provided. The reverse clamp may include a back portion, a first arm, and a second arm. The first and second arm extending from the back portion to form an opening configured to receive a cylindrical arm.

13 Claims, 13 Drawing Sheets

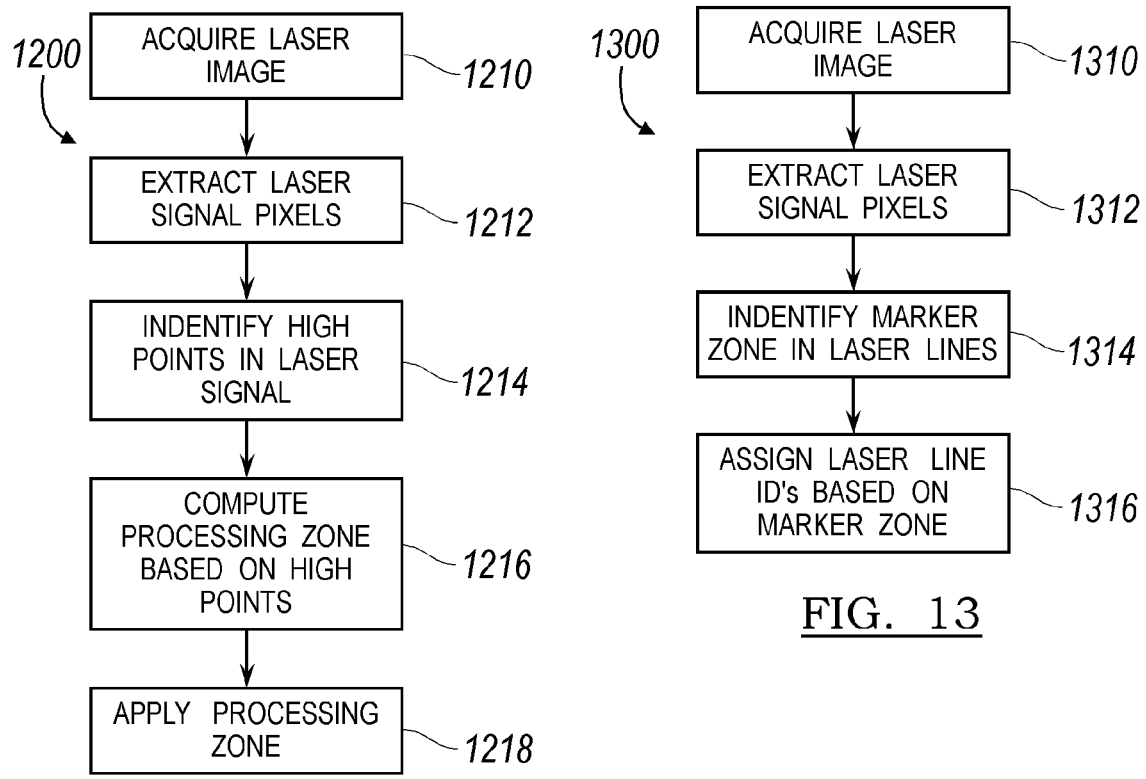
FIG. 12
FIG. 13
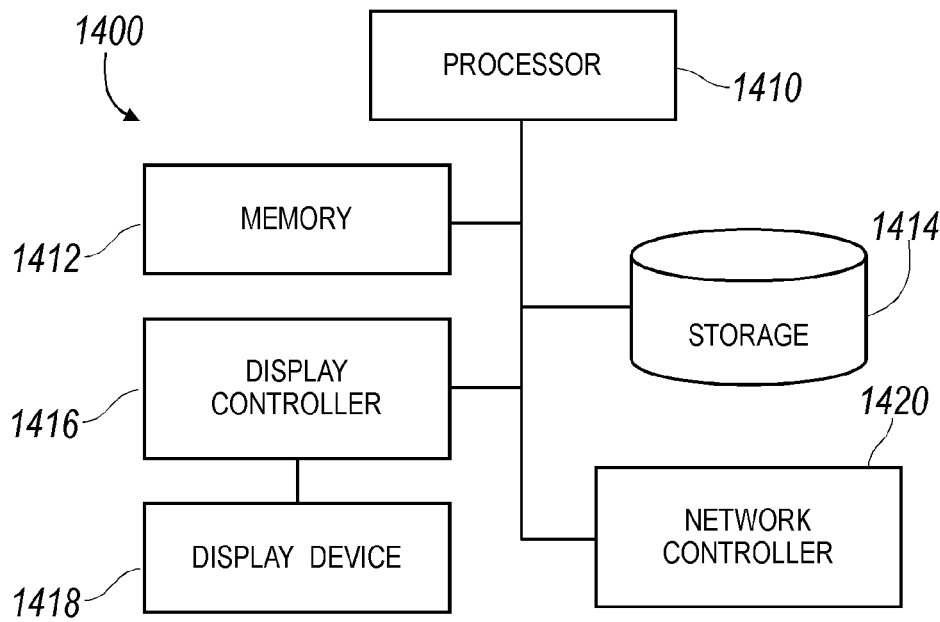
FIG. 14

US 7,995,218 B2

SENSOR SYSTEM AND REVERSE CLAMPING MECHANISM

PRIORITY CLAIM

This application is a continuation-in-part of U.S. application Ser. No. 12/474,911 filed on May 29, 2009, which is incorporated in its entirety by reference herein.

BACKGROUND

1. Field of the Invention

The present application is generally related to sensor system and a reverse clamp.

2. Description of Related Art

Optical sensing systems require precise calibration and alignment. However, many sensors utilize fasteners to mount components such as sensors or illumination sources into a sensor structure. As such, the tightening of the fasteners may not be consistent for each sensor or person. Inherent inaccuracies can be introduced between sensors even during the alignment and calibration processes due to torque variation in the fasteners.

In view of the above, it is apparent that there exists a need for an improved sensor system.

SUMMARY

In satisfying the above need, as well as overcoming the enumerated drawbacks and other limitations of the related art, the present application provides a sensor system with a sensor, a laser source, and a mounting structure. The sensor being fixed to the mounting structure using a reverse clamp and a cylindrical arm.

In another aspect of the application, a reverse clamp is provided. The reverse clamp includes a back portion, a first arm, and a second arm. The first and second arms extend from the back portion to form an opening configured to receive the cylindrical arm. For example, the back portion, the first arm, and the second arm form an interference fit between the opening and the cylindrical arm in a resting state and wherein the first arm and the second arm flex such that the opening matches a diameter of the cylindrical arm in a flexed state.

Further objects, features and advantages of this application will become readily apparent to persons skilled in the art after a review of the following description, with reference to the drawings and claims that are appended to and form a part of this specification.

BRIEF DESCRIPTION OF THE DRAWINGS

FIG. 12 is a flow chart illustrating a method for dynamic image processing window adjustment;

FIG. 13 is a flow chart illustrating a method for dynamic identification of laser lines;

FIG. 14 is a block diagram of a system illustrative of one implementation of the controllers, processors, or modules in the instant application;

DETAILED DESCRIPTION

Figure 1:
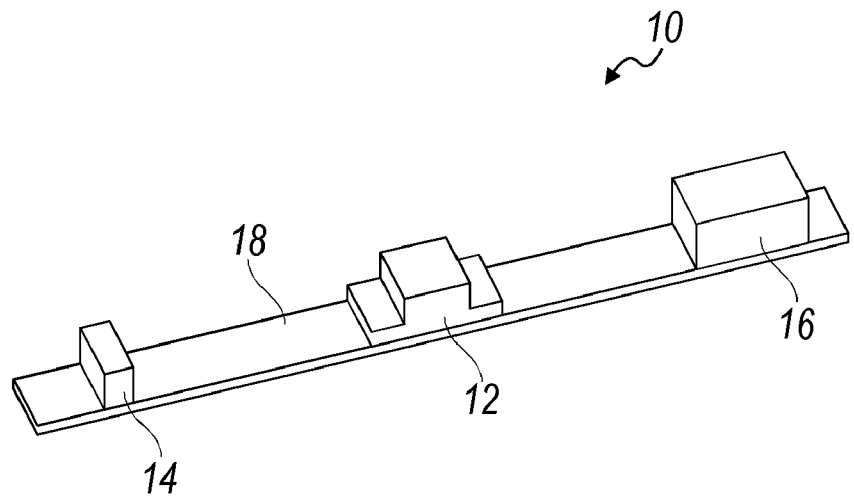
FIG. 1 is a block diagram illustrating a sensor system in accordance with one embodiment of this application.

Referring now to FIG. 1, a system embodying the principles of the present application is illustrated therein and designated at 10. The system 10 includes sensor 12, a first laser source 14, a second laser source 16, and a mounting structure 18.

The sensor 12 may comprise a camera including receiving optics and a detector such as a CCD or CMOS array. Accordingly, the sensor 12 has a field of view that projects outwardly from the camera and a range of focus that is defined by the receiving optics of the sensor. The field of view and depth of focus define a sensing volume of the sensor 12. The first laser source 14 may project one or more laser lines onto an object. If more than one laser line is projected from the first laser source 14 the lines may be parallel to one another. In addition, the laser lines may be equally spaced with respect to each other. The first laser source 14 is oriented at an angle relative to the sensor such the laser lines intersect the field of view to define the sensing volume. In one configuration, the laser lines may be projected such the center laser line intersects the center of the sensing volume. Alternatively, if there is an even number of laser lines, the middle two laser lines may be approximately an equal distance from the center of the sensing volume.

The sensor 12 and the first laser source 14 may both be attached to the mounting structure 18. The mounting structure 18 may be an optical bench, tube, or other rigid form. The mounting structure 18 may be made from a material with a low coefficient of expansion so that the relationship between the sensor 12 and the first laser source 14 is held constant across a wide temperature range. Alternatively, the mounting structure 18 may include a number of temperature sensors to compensate for expansion of the mounting structure material. The mounting structure 18 may be formed from a number of materials including but not limited to steel, invar, aluminum, or other industrial materials. For example, the mounting structure 18 may be an I-tube (shown as reference numeral 1510 in FIG. 15). As such, the mounting structure 18 provides both passive thermal management as well as provides a linear response. The linear response without hysterisis enables accurate active thermal compensation.

The sensor 12 and the first laser source 14 may be factory aligned relative to one another. For example, the sensor 12 and first laser source 14 may be mounted onto the mounting structure 18 with the use of various fixtures to control the alignment and/or relative position of the sensor 12 and first laser source 14. In addition, the sensor 12 and first laser source 14 may be mounted to a precision stage, for example through the mounting structure 18. The precision stage may include a known target. The known target may be moved throughout the sensing volume by the precision stage such that the relationship between the sensed position of the target can be calibrated throughout the sensor volume. The calibration can be stored in the sensor as various sensor system model parameters including sensor parameters, laser source parameters, etc.

Based on the calibration, the relationship between the sensor 12 and the first laser source 14 is known and triangulation may be used to determine the distance from the sensor 12 to a position where a laser line intersects a feature in the sensing volume. As such, the position of the feature relative to the sensor 12 can be determined based on the factory calibration regardless of the orientation or positioning of the sensor 12. Further, a system including many sensors may be formed by determining the position and orientation of each sensor relative to a master coordinate space. This may be done for larger systems by using a laser tracker or theodalites to determine the position and orientation of the sensors directly or by using such devices to determine the position and orientation of a target in the sensing volume then determining a transform between the sensor coordinate space and the master coordinate space.

A second laser source 16 may also be provided. The second laser source 16 may be a laser projector such as a structured light projector or a moiré fringe projector. The second laser source 16 may be mounted to the mounting structure 18 or alternatively may be mounted independently of the mounting structure 18. If the second laser source 16 is mounted on the mounting structure 18, the position and orientation of the second light source may be factory calibrated similar to the first laser source 14. However, often times the geometry of the part or the tooling where the part is to be measured may present certain environmental constraints that would limit the effectiveness of the second laser source 16 being mounted to the mounting structure 18. In this scenario, a known target may be positioned into the sensing volume and the position of the known target to the sensor may be determined based on a triangulation of the laser line with the sensor. For example, the laser line may be projected on a flat surface and the position and orientation of the surface determined based on the position of the laser stripe within the field of view of the sensor. The second set of lines may then be projected onto the surface and the orientation and position of the second laser source may be determined based on the projected line pattern on the surface. For example, the spacing and angle of an array of line stripes formed on the surface intersect with the laser stripe from the first laser source 14. The intersection points between the laser stripe and the pattern from the second laser source 16 can be used to determine the position and orientation of the second laser source 16.

Figure 2:
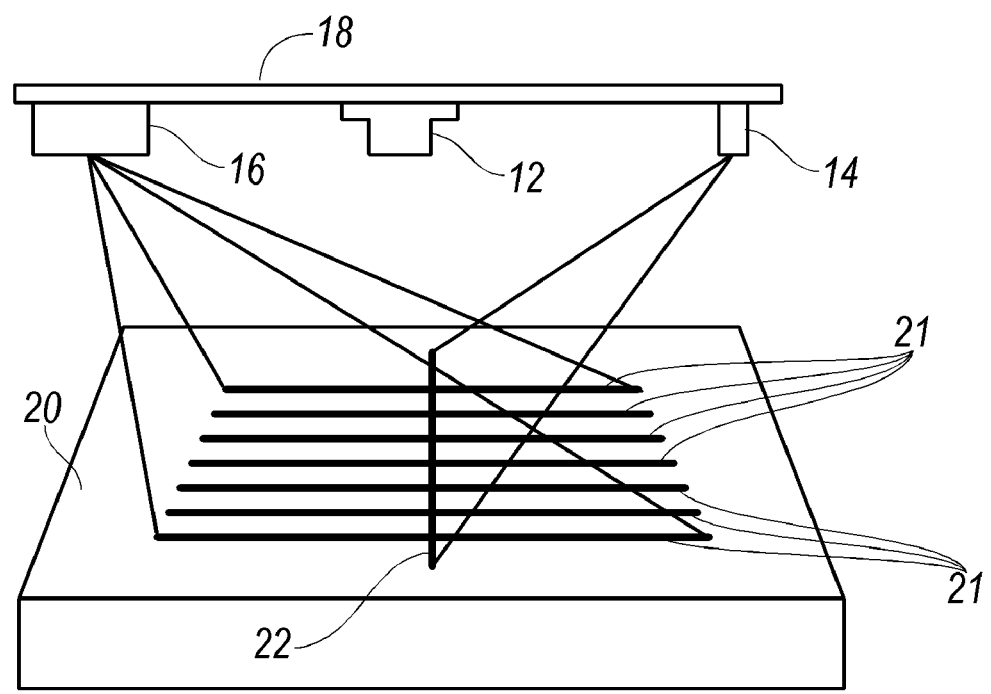
FIG. 2 is a block diagram illustrating a sensor system including a structured light projector.

Therefore, the second laser source 16 may be a structured light projector, as depicted in FIG. 2. As discussed, the detector 12 is calibrated with respect to first laser source 14. As such, these two components work together using triangulation principles. The angle between the first laser source 14, thus the laser line, and the optical axis of the sensor are used to determine the distance and location of features on the surface 20. In, addition the second laser source 16 projects a series of lines onto the surface 20. The series of lines 21 from the second laser source 16 may be oriented orthogonal to the line or lines from the first laser source 14. The intersection of the line or lines from the first laser source 14 is used to determine the surface position of the series of lines 21 on the surface from the second laser source 16. The line 22 from the first laser source 14 may as a reference for the projected pattern from the second laser source 16. The surface is then modeled using a camera/optics model. The camera/optics model may be generated based on taking a few field calibration images once the sensor is finally mounted using a flat surface at a number of distances from the sensor. Accordingly, the second laser source 16 can be mounted separately from the sensor 12 and first laser projector 14, and field calibrated, as described above.

Figure 3:
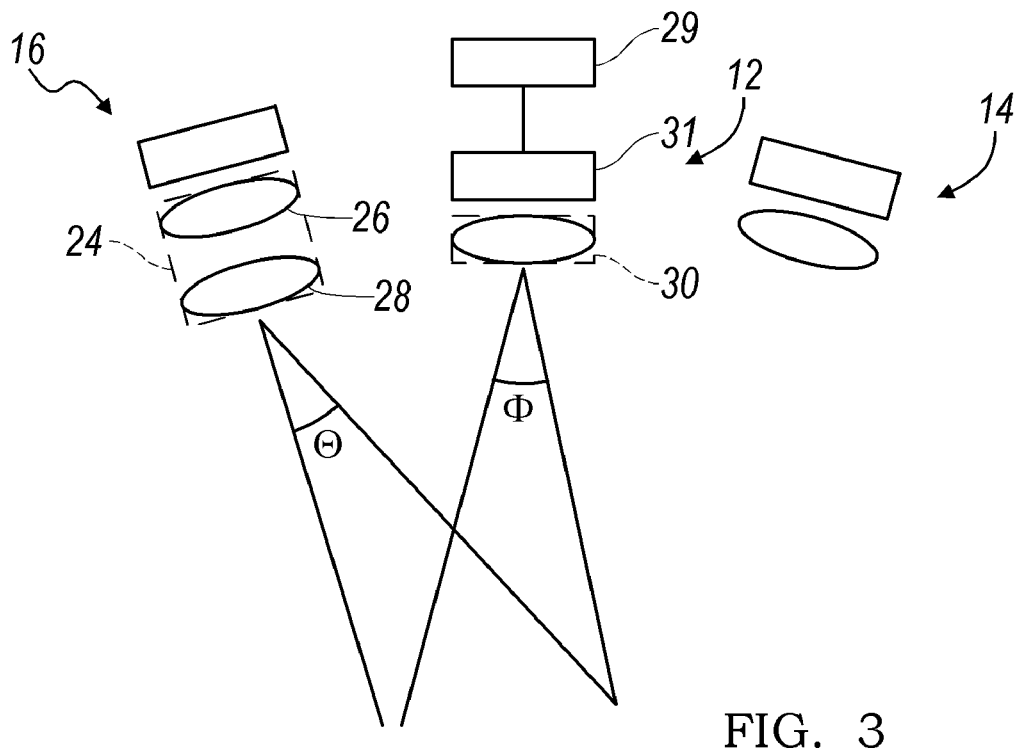
FIG. 3 is a block diagram of a sensor system illustrating the optical elements of the laser sources and sensor.

The mechanics of the sensor system of FIG. 1 are further explained with respect to FIG. 3. The keystoning effect of the structured light pattern increases the depth sensitivity of the measurement. Therefore, projection angle (theta) of second laser source 16 should be designed to be different than the receiving angle (phi) of the sensor 12. For example, the projection angle may be 10 to 15 degrees different than the receiving angle. To facilitate the key stoning effect, the projection optical system 24 of the laser projector 16 may include two lenses 26, 28. The additional lens 28 may be used to vary the magnification between the receiving optic 30 and the projection optical system 24. Specifically, the projection optical system 24 may have 1.5-3 times the magnification of the receiving optic 30 within the sensing volume. Although, other ratios may be used, this may provide particular benefits for many industrial applications.

Each of the first and second laser sources 14, 16 and the detector 31 may be in communication with the sensor controller 29. The sensor controller 29 may independently control the time and intensity of each laser source 14, 16. In addition, the sensor controller 29 controls the acquisition and integration time of the detector 30. The sensor controller 29 may alternate the projection of the first set of laser lines from the first source 14 and the second set of laser lines from the second laser source 16. In addition, the detector 31 may be synchronized with the projection of the first and second laser sources 14, 16 to capture the first set of laser lines from the first laser source 14 in the first image and the second set of laser lines from the second laser source 16 in a second image.

Figure 4:
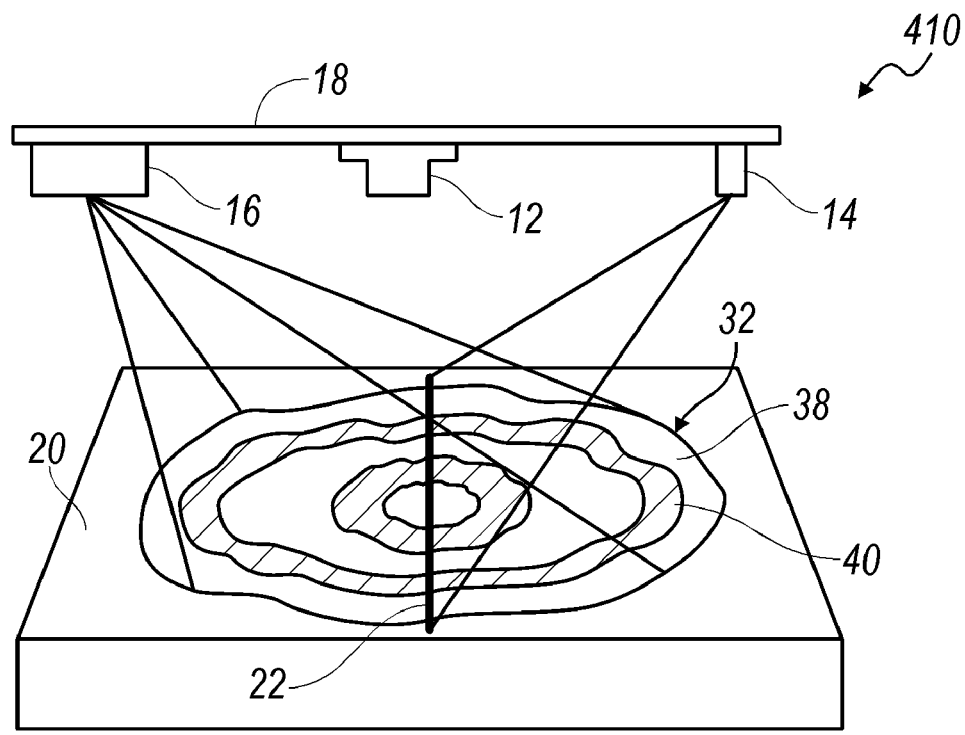
FIG. 4 is a block diagram illustrating a sensor system including a moiré fringe projector.

The second laser source 16 may also be a moiré fringe projector, as illustrated in the system 410 of FIG. 4. The moiré fringe projector may emit two wavelengths of laser beams that interfere, thereby projecting a moiré fringe pattern 32 onto the surface 20. The moiré fringe pattern 32 is like a topographical map with each ring of the fringe pattern equating to a different distance from the second laser source 16. The moiré fringe pattern 16 includes alternating rings of light rings 38 and dark rings 40 that tend to have a sinusoidal profile. Again, the line 22 acts as a reference relative to the distance of each of the rings.

Figure 5:
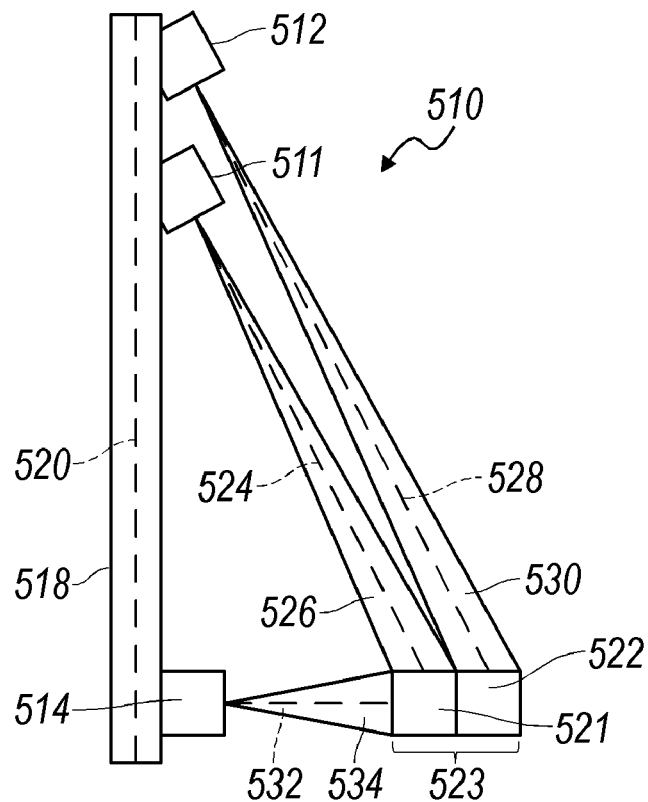
FIG. 5 is a block diagram illustrating a sensor system including a dual sensor configuration.

Another embodiment of the sensor system is illustrated in FIG. 5. The sensor system 510 includes a first sensor 511, a second sensor 512, and a laser source 514. The first sensor 511 and second sensor 512 are attached to a mounting structure 518. The first sensor 511 and second sensor 512 may be CCD, CMOS, or other similar sensors including other features, such as a sensor controller, as described with regard to sensors of the previous embodiments. The laser source 514 is also attached to the mounting structure 518 and is configured to project a laser pattern 534 onto an object. The laser pattern may be any of the patterns described above, or more specifically, may include a series of lines that are pre-calibrated relative to each of the first sensor 511 and second sensor 512. The pre-calibration may be a factory calibration as described relative to the previous embodiments.

The sensor system 510 has a sensor axis 520 that is substantially perpendicular to the optical axis 532 of the laser source 514. A first sensor 511 is oriented at an angle relative to the sensor axis 520 that is slightly less than the second sensor 512. For example, the first sensor 511 may have an optical axis 524 that is oriented at a 17° angle relative to the sensor axis 520. Further, by way of example, the second sensor 512 may have an optical axis 528 that is oriented at a 22° angle relative to the sensor axis 520. As such, the first sensor 511 has a field of view denoted by reference number 526 that intersects with a laser projection 534 to form a sensing volume 521. The axis of the laser projection 534 may be orthogonal to the sensor axis 520 and may be in plane with the sensor optical axes 528 and 524. Similarly, the second sensor 512 has a field of view 530 that intersects with the laser projection 534 to form a second sensing volume 522. The first and second sensor 511 and 512 are oriented such that the first sensing volume 521 and the second sensing volume 522 form a contiguous sensing volume 523.

Figure 6:
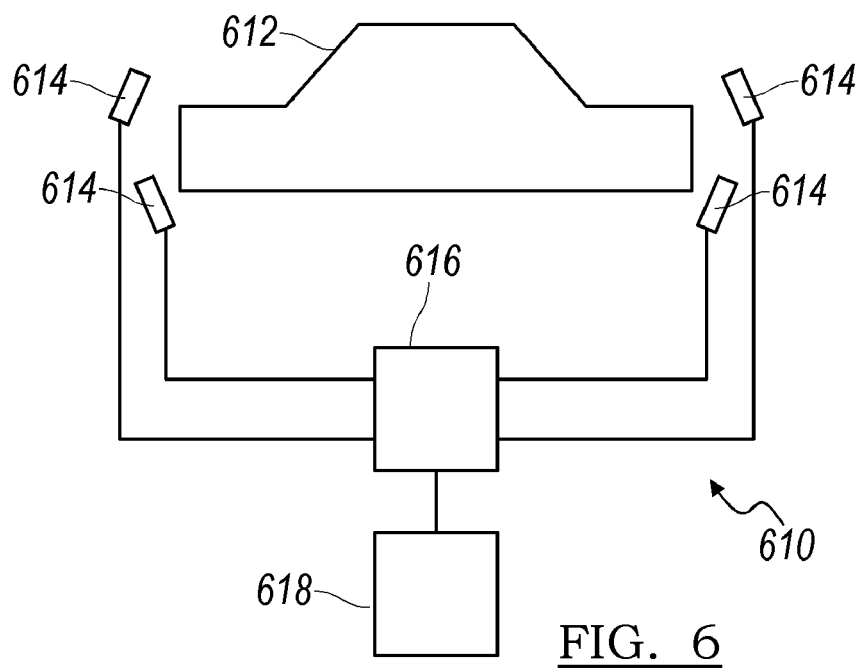
FIG. 6 is a block diagram illustrating one embodiment of a system for measuring features with the disclosed sensor implementations.

The first sensing volume 521 slightly overlaps with the second sensing volume 522 to form the contiguous sensing volume 523. The sensing volume 521 is closer to the mounting structure and sensing volume 522 and most of the sensing volume 521 does not overlap with the sensing volume 522, and similarly most of the sensing volume 522 does not overlap with sensing volume 521. For ease of illustration, the sensing volumes are shown as squares. However, it is clear that the first sensing volume 521 and second sensing volume 522 would have an actual 3-D shape formed by the intersection of the first field of view 526 with the laser projection 534 and the second field of view 530 with the laser projection 534, respectively. This shape would, of course, be expanding as the distance increases relative to the sensor or projector and may have curved outer regions based on the effects of the optical system. As such, the first sensor 511 and the second sensor 512 work together thereby greatly increasing the depth of field which can be analyzed while providing sufficient resolution for most applications. Further, it is also clear that similar to the previous embodiments, a second laser source may also be provided and oriented to project a laser pattern to intersect with the first and second sensing volumes 521, 522. As discussed above, the second laser source may be attached to the mounting structure or mounted independently In FIG. 6, a measurement system 610 including an array of sensors 614 is provided. Each sensor 614 corresponds to a sensor system 10, 410 or 510 including any variation or combination thereof described above. The system 610 includes a controller 616 and at least one sensor 614. There may be a number of sensors 614 located about a vehicle body or frame 612 to measure geometric dimensional deviations at a number of specified locations. Alternatively, a single sensor may be used along with a motion device such that the sensor 614 is able to measure multiple features along the vehicle body 612. For example, the sensor 614 may be attached to a robotic arm that can be manipulated to measure a number of features at various locations on the vehicle body 612.

The sensor 614 is in electrical communication with the controller 616 to provide a set of data for each feature measured. The sensor 614 may include an on board processor to analyze the image data and generate feature data, for example indicating the position and orientation of feature. The feature data may be communicated to the controller 616. The sensor 614 may communicate with the controller 616 over a number of wired or wireless communication protocols including but not limited to Ethernet. The controller 616 includes a microprocessor configured to analyze the data. In addition, the controller 616 is in communication with an alarm system 618 to generate an alert based on the measurements from the sensor 614. The alarm system 618 may comprise a visual indicator such as a flashing light, an audio indicator such as a siren, or both. In addition, the alarm system 618 may comprise a communication system configured to send an email, phone message, pager message, or similar alert.

Figure 7:
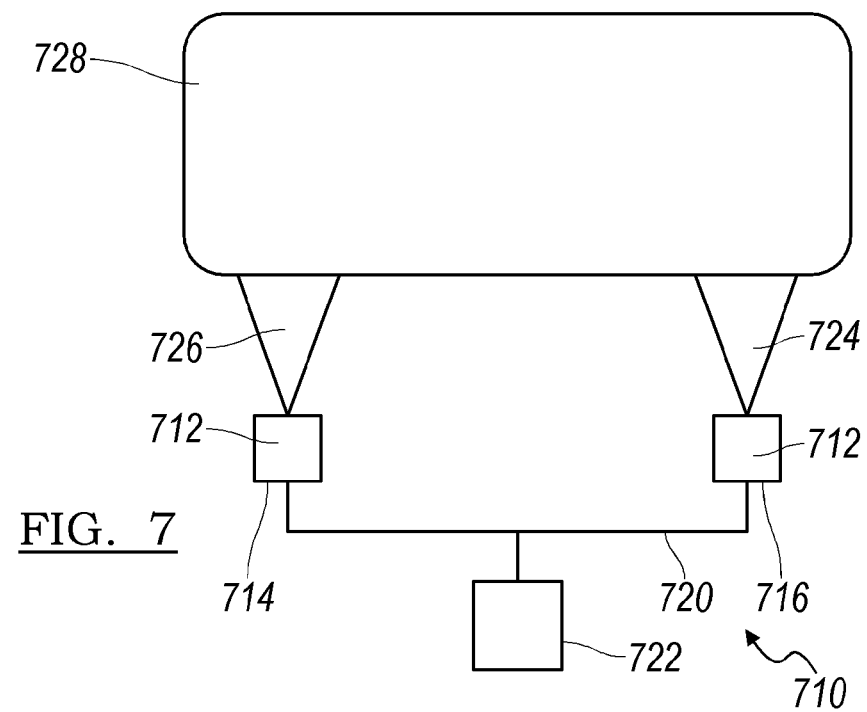
FIG. 7 is a block diagram illustrating one embodiment of a system for measuring wheel alignment with the disclosed sensor implementations.

Now referring to FIG. 7, an inspection system 710 is provided for the inspection of wheel alignment of a vehicle. As such, the inspection system 710 includes two sensor systems 712 which may correspond with any of the sensor systems 10, 410, or 510 including variations described in the previous embodiments or combinations thereof. However, for illustrative purposes, the system 710 will be described further with regards to the implementation of the sensor system 510 shown in FIG. 5. As such, the inspection system 710 includes a left sensor 714 that projects a laser pattern 726 onto a left side of tire 728. Similarly, inspection 710 includes a right sensor 716 that projects a second laser pattern 724 onto the right sidewall of the tire 728. Accordingly, the left sensor 714 and the right sensor 716 may determine the position and orientation of both the left sidewall of the tire and right sidewall of the tire 728 to determine an overall position and orientation of the tire 728.

The system 710 may be duplicated for each tire on the vehicle and accordingly a wheel alignment calculation may be performed including such measurements as toe, camber, pitch, etc., for each wheel of the vehicle. The sensor system 712 may be in communication over a communication link 720 to a controller 722. The communication link 720 may include wired or wireless communications including serial communications, Ethernet, or other communication mediums. The controller 722 may include a processor, memory, and display to perform a wheel alignment measurement. In addition, the controller 722 may be in communication with other sensor systems 712 measuring other tires or other controllers configured to inspect the alignment of other wheels on the vehicle.

Figure 8:
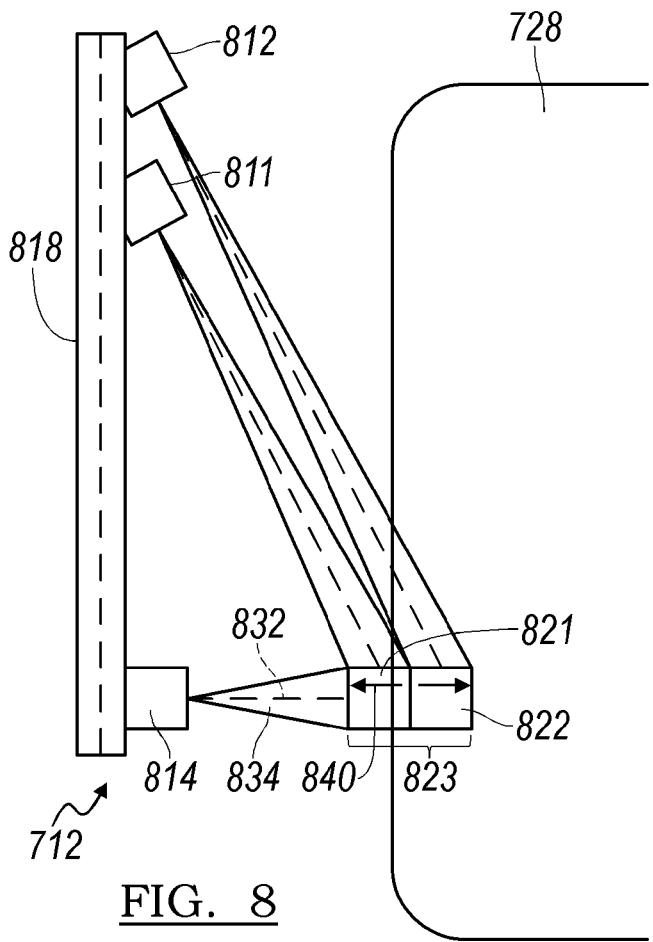
FIG. 8 is a side view of one embodiment of a system for measuring wheel alignment with the sensor implementation of FIG. 5.

Now referring to FIG. 8, a side view of the system 810 is provided illustrating one embodiment of the system in FIG. 7 implementing a dual sensor system described in FIG. 5. The sensor system 812 includes a first sensor 811 a second sensor 812, and a laser source 814. Each of the first sensor 811, the second sensor 812, and the laser source 814 may be attached to the mounting structure 818. The field of view of each of the first and second sensor 811, 812 intersect with the laser projection 834 of the laser source 814 to form a first and second sensing volume 821, 822. Further, the first sensing volume 821 and second sensing volume 822 overlap to form a continuous system sensing volume 823. As described above in reference to FIG. 5, the contiguous sensing volume 823 allows for increased sensing range between the sensor system 712 and the wheel 728.

This increased sensing range denoted by arrow 840 allows for the accommodation of a large number of tire models and wheel base vehicles, as well as a large steering angle change during a wheel alignment inspection. Further, the laser source 814 may include optics that provide a 1.5 to 3 times magnification relative to the receiving optics of both the first sensor 811 throughout the first sensing volume 821 and the second sensor 812 throughout the second sensing volume 822.

Figure 9:
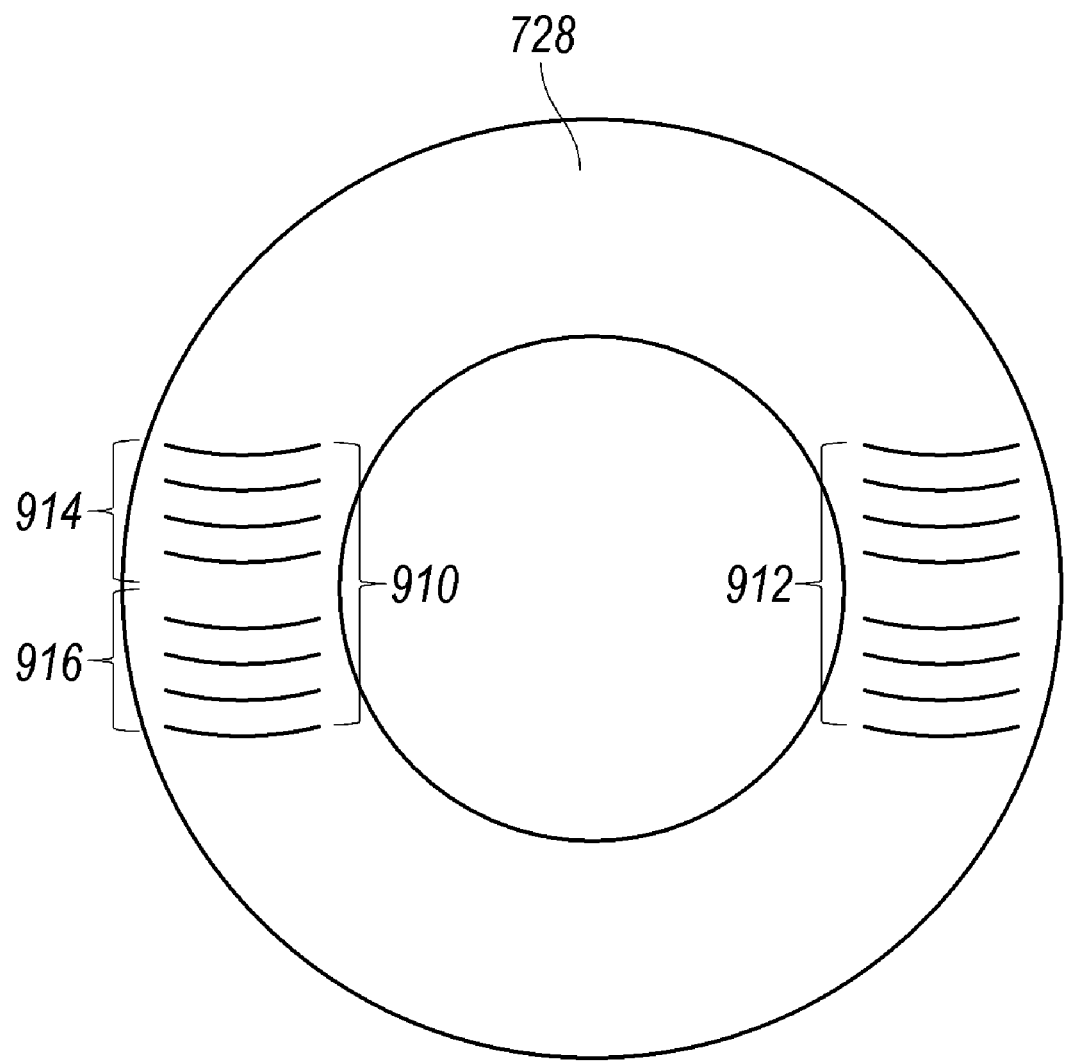
FIG. 9 is a front view of a laser pattern projected onto a tire for one embodiment of a system for measuring wheel alignment.

Now referring to FIG. 9, a front view of the tire illustrating one embodiment of the projected laser pattern is provided. In this embodiment, the left sensor 714 projects a laser pattern 910 including a series of parallel lines onto the left-hand sidewall of the tire 728. Similarly, the right sensor 716 projects a pattern 912 including a series of lines onto the right-hand sidewall of the tire 728. The pattern may include a first set of lines 914 and a second set of lines 916, where the first set of lines 914 are parallel and have equal spacing between each consecutive line. Similarly, the second set of lines 916 may have a set of parallel lines where each consecutive line has equal spacing. Further, the spacing for the second set of lines 916 may be the same as the spacing provided in the first set of lines 914.

Figure 10:
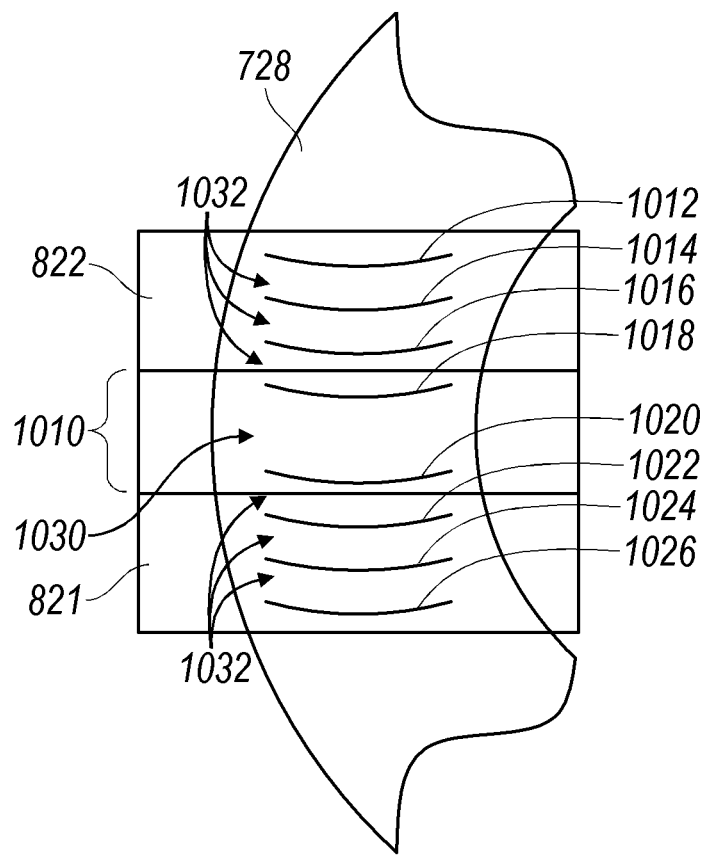
FIG. 10 is a front view of a laser pattern projected onto a tire for one embodiment of a system for measuring wheel alignment.

Now referring to FIG. 10, the first and second set of lines 914 and 916 are described in more detail. The first set of lines 914 may include a first line 1012, a second line 1014, a third line 1016 and a fourth line 1018. Further, the second set of lines may have a fifth line 1020, a sixth line 1022, a seventh line 1024 and an eighth line 1026. The lines may have equal spacing as denoted by reference numeral 1032. However, the distance between the fourth line 1018 and the fifth line 1020 may include a greater spacing 1030 as a line identification. The spacing 1030 may be, for example, twice the spacing as between the other lines. This may be easily and effectively accomplished by modifying the grating of a laser line projection source such that the middle two lines of the grating are not etched but filled in and therefore do not transmit light. The additional spacing 1030 may be used to identify specific line numbers in the pattern.

The first sensing volume 821 of the first sensor and the second sensing volume 822 of the second sensor may have an overlap region 1010 such that the double spacing 1030 may be detected by each of the first sensor and second sensor. Accordingly, the overlap 1010 would be great enough to show the fourth line 1018 in the first sensing volume 821 and the fifth line 1020 in the second sensing volume 822. However, as can be readily understood, the array of lines may include more than eight lines and as such, the fourth line 1018 and the fifth line 1020 would be representative of the middle two lines of the pattern. Using the change in spacing encodes the line pattern and allows the system to easily identify the middle two lines, thereby identifying each line within each sensing volume. After identifying each line, the relationship between the position of the object, in this case the wheel 728 may be determined using a sensor model and the predetermined calibration parameters. The sensor model may include a camera model that accounts for the detector and optical parameters of the sensor, as well as, a laser source model that accounts for the laser pattern and projection objects. Further, the sensor model and laser source model may be linked by the predetermined calibration parameters to provide 3D point cloud data on the object.

Figure 11:
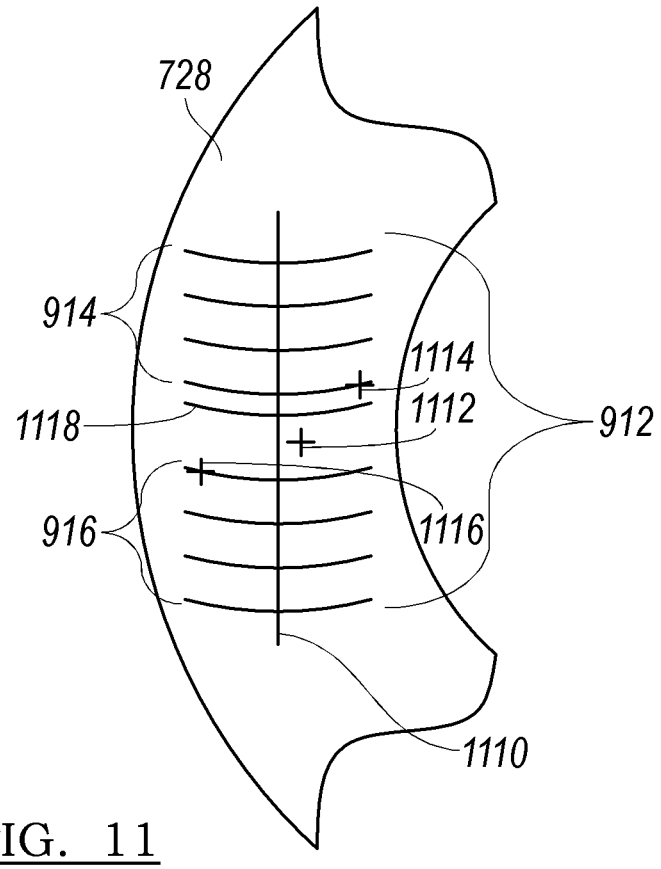
FIG. 11 is a front view illustrating various laser pattern implementations projected onto a tire for one embodiment of a system for measuring wheel alignment.

Now referring to FIG. 11, additional embodiments are provided for identifying each line in the pattern 912. In one embodiment a second laser line 1110 may be provided orthogonal to the series of laser lines from a second laser projector. Alternatively, a unique symbol 1112, such as a crosshair, may be provided in addition to the series of lines that may be used to identify each of the lines in the series based on a spacial relationship. In another alternative, each of the middle two lines may have a mark 1114, 1116, such as a cross tick where the cross tick 1114 on the first set of lines 914 is on one side and the cross tick 1116 of the second set of lines 916 is on an opposite side. As such, each of the cross ticks is distinguishable and may be used to identify each of the lines in the series of lines based on the spacial relationship. In yet another alternative, the spacing between the lines may vary such that the number of each line may be identified based on a varied spacing relationship between one or more of the consecutive lines. In one example, a double line 1118 may be provided. The two lines may be provided closely together uniquely identifies one line in the series of lines and then each of the other lines may be identified by a consecutive spacial relationship. Further, other identifying characteristics may be provided for encoding the series of consecutive lines including other various unique marks, or line spacing, line thicknesses, or line orientation.

Now referring to FIG. 12, a method for dynamic image processing window adjustment is provided. A method 1200 starts in block 1210. In block 1210, a laser source projects a pattern onto a feature and an image is acquired of the pattern intersecting the feature. In one implementation, the pattern may be the parallel lines 912 in FIG. 9. In block 1212, the laser signal pixels are extracted from the image. As such, each of the pixels along the line may be transformed into a line intensity profile. As such, a reference line is defined that is substantially orthogonal to the series of laser lines and may be acquired with temporal offset. A laser line profile is determined by adding the intensity value orthogonal to the reference line after correction for sensor and laser projection distortions by a camera and/or laser projection model. In block 1214, high points are identified in the laser profile. Processing zones are computed based on the high points in the profile, as denoted by block 1216. Finally, processing zones are applied and 3D point cloud data is extracted based on general triangulation principles.

Referring to FIG. 13, a method for the dynamic identification and assignment of laser lines is provided. The method 1300 starts in block 1310. In block 1310, the laser is projected onto the feature and an image is acquired. In block 1312, the laser signal pixels are extracted. The marker zones in the laser lines are identified as denoted by block 1314. The laser line data is projected on to a reference line, a threshold is applied to integrated projected values to identify nodes points on the laser lines. The node points along the reference line are then extracted. The reference line may represent the mean location on the object being measured. The spacing between nodes are then used to identify line numbers. In one exemplary, the numbering will start from the center where we have higher spacing relative to its immediate neighbors. In block 1316, the laser line numbers are assigned based on the marker zones.

As such, it is understood that the method shown in FIGS. 12 and 13 may be utilized together in a single process. For example, the marker zones may be identified 1314 and laser line numbers assigned 1316 in between step 1216 and the point cloud data being extracted. Further, the above described methods may be performed by the sensor controller and as such the point cloud data may be transmitted from the sensor to the system controller. Alternatively, the system controller may be utilized for implementing the methods.

Figure 15:
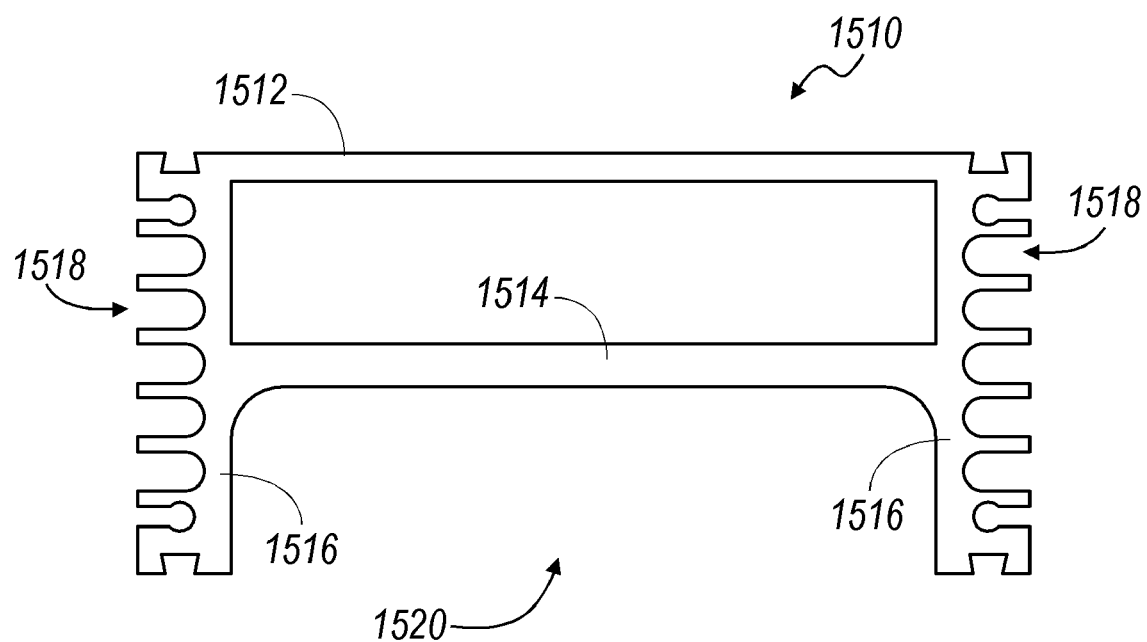
FIG. 15 is a top view of a mounting structure for a sensor system.

Referring to FIG. 15, the mounting structure 18 may be an I-tube 1510. The I-tube includes a tube portion 1512 with an I-beam 1514. Walls 1516 extend beyond the I-beam 1514 and form a recess 1520. The laser source and detectors may be mounted in the recess 1520 to the I-beam 1514. In addition, the I-tube may include cooling fins 1518 to increase dissipation of heat. The I-tube 1510 may be formed from a number of materials including but not limited to steel, invar, aluminum, or other industrial materials. The I-tube 1510 may include a number of temperature sensors to compensate for expansion of the I-tube material. As such, the I-tube 1510 provides both passive thermal management as well as provides a linear response. The tubular shape and I-beam limit expansion in directions other than along the length of the tube. The linear response without hysterisis enables accurate active thermal compensation.

Figure 16:
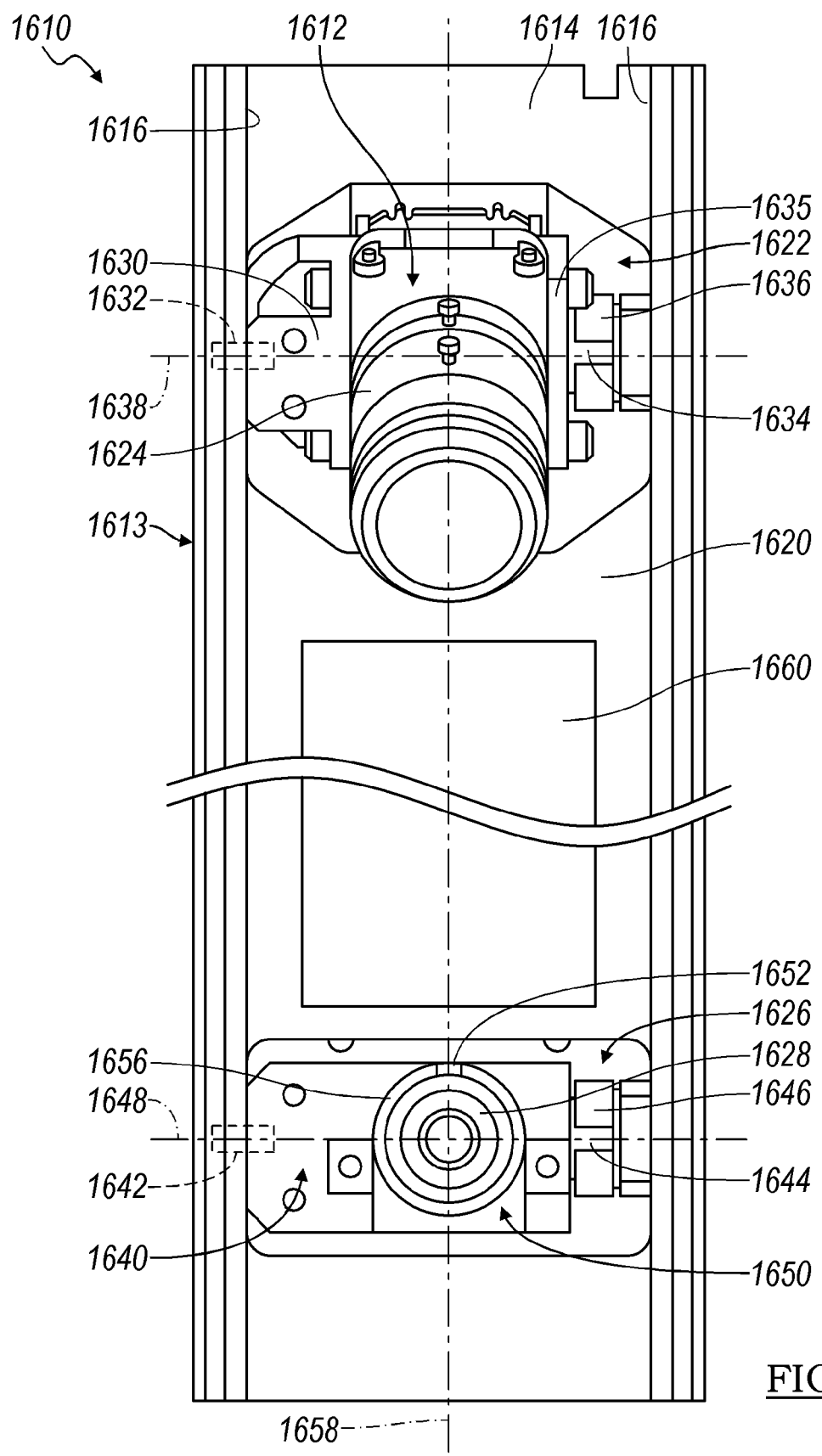
FIG. 16 is a front view of a sensor system.

Now referring to FIG. 16, a sensor system is shown that may further utilize an I-tube configuration. The sensor system 1610 includes a camera 1612 and a laser source 1628. The camera 1612 and the laser source 1628 may be of the type described with regard to the other embodiments provided herein. The sensor structure 1613 may include side walls 1616 corresponding to the walls 1516 of the I-tube structure in FIG. 15. Further, the sensor structure 1613 also includes a cross beam or I-beam 1614 corresponding to the I-beam 1514. Further, the cross beam 1614 and walls 1616 form a recess 1620 corresponding to recess 1520 in FIG. 15. The camera 1612 is mounted to the sensor structure 1613 such that it is rotatable about an axis 1638 that is perpendicular to the side walls 1616. In one implementation, the camera 1612 may be mounted to a mounting plate 1630, for example, using fasteners, adhesive, or other fastening methods. The mounting plate 1630 may include a recess to receive a pin 1632. Pin 1632 extends from a mounting plate 1630 into a opening in the side wall 1616. The pin 1632 may be a cylindrical pin with the central axis in alignment with line 1638 allowing the mounting plate 1630 to rotate about line 1638. In addition the mounting plate 1630 may include a cylindrical arm 1634 extending from the mounting plate 1630. For example, the cylindrical arm 1634 may have a central axis in alignment with line 1638 allowing the camera 1612 to rotate about axis 1638. The cylindrical arm 1634 is received by a reverse clamp 1636. In addition, the camera may be mounted towards the center of the structure 1613 as such an opening 1622 may be provided so that the camera 1612 may partially extend through beam 1614.

The reverse clamp 1636 may form an interference fit with the cylindrical arm 1634. Accordingly, as the reverse clamp is expanded, the cylindrical arm 1634 is allowed to rotate and as such the camera 1612 may also rotate. However, in its normal state, clamp 1636 engages cylinder 1634 in an interference fit preventing any rotation of the camera 1612 or the mounting plate 1630.

The laser source 1628 is mounted to the sensor structure 1613 such that it is rotatable about an axis 1648 that is perpendicular to the side walls 1616 and parallel to axis 1638. In one implementation, the laser source 1628 may be mounted to a mounting plate 1640, for example, using fasteners, adhesive, or other fastening methods. The mounting plate 1640 may include a bore to receive a pin 1642. Pin 1642 extends from a mounting plate 1640 into a opening in the side wall 1616. The pin 1642 may be a cylindrical pin with the cylindrical axis in alignment with line 1648 allowing the mounting plate 1640 to rotate about line 1648. In addition, the mounting plate 1640 may include a cylindrical arm 1644 extending from the mounting plate 1640. For example, the cylindrical arm 1644 may have a central axis in alignment with line 1648 allowing the laser source to rotate about axis 1648. The cylindrical arm 1644 is received by a reverse clamp 1646. In addition the laser source 1628 may be mounted towards the center of the structure 1613 and, as such, an opening 1626 may be provided so that the laser source 1928 may partially extend through beam 1614.

The reverse clamp 1646 may form an interference fit with the cylindrical arm 1644. Accordingly, as the reverse clamp 1646 is expanded, the cylindrical arm 1644 is allowed to rotate and, as such, the laser source may also rotate. However, in its normal state clamp 1646 engages cylinder 1644 in an interference fit preventing any rotation of the laser source 1628 or the mounting plate 1640.

The laser source 1628 may have a optical axis that is in plane with the optical axis of the camera 1612 as denoted by line 1658. The mounting plate 1640 is in communication with a base of 1652 of the reverse clamp 1650 through flex plate 1654. As such the angle of the base 1652 and, thereby, the angle of the laser source 1628 may be adjusted by applying pressure to the base 1652 causing the flex plate 1654 to bend or flex.

Further, a reverse clamp 1656 is provided in an interference fit with the housing of the laser source 1628 the arms 1656 of the reverse clamp 1650 engage the housing of the laser source 1628, in normal state. However, in an expanded state, force may be applied to the arms 1656 thereby allowing the laser source 1628 to be rotated or moved from the reverse clamp 1650. In addition, a circuit 1660 including a controller with a processor can be mounted to the sensor structure 1613, for example, the I-beam 1614. In this scenario, the processing electronics can be integrated directly into the sensor system 1610 for a convenient onboard processing.

Figure 17:
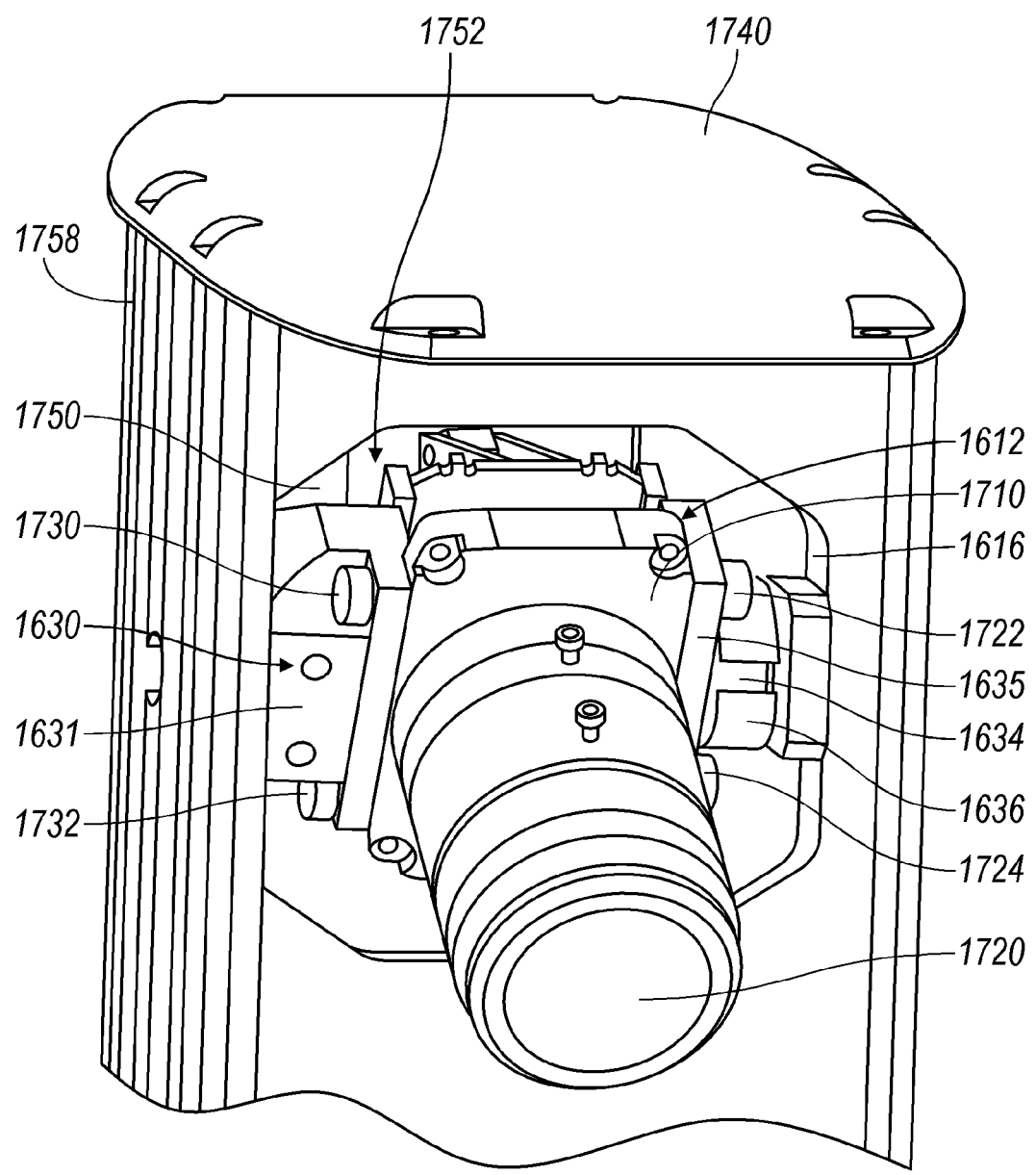
FIG. 17 is a perspective view of a portion of the sensor system in FIG. 16.

A more detailed view of the camera 1612 is provided in FIG. 17. The mounting plate 1630 may be implemented in multiple pieces for example mounting bracket 1631 and mounting bracket 1635. In this example mounting bracket 1631 is mounted to the camera 1612 through fasteners 1730 and 1732. Similarly, bracket 1635 may be mounted to the opposite side of the camera 1612 by fastener 1722 and 1724. As such, the pin 1632 would extend into both the wall 1616 and the bracket 1631. Similarly, the cylindrical arm 1634 would extend from bracket 1635 and be received by the reverse clamp 1636. In addition, walls 1616 may include fins 1758 corresponding to cooling fins 1518 of FIG. 15. A mounting clamp 1760 may engage the fins 1758 to secure the sensor system to a inspection structure. In addition, the camera may include electronics 1710 and a lens 1720. If the electronics 1710 require additional space a opening 1752 may be formed in wall 1750. Wall 1750 corresponds to wall 1512 in FIG. 15. The size of the openings 1752 and 1626 are generally minimized to preserve the structural integrity of the sensor structure 1613. Further, the openings may use chamfers or fillets to minimize the space of the opening around the camera or laser source.

Figure 18:
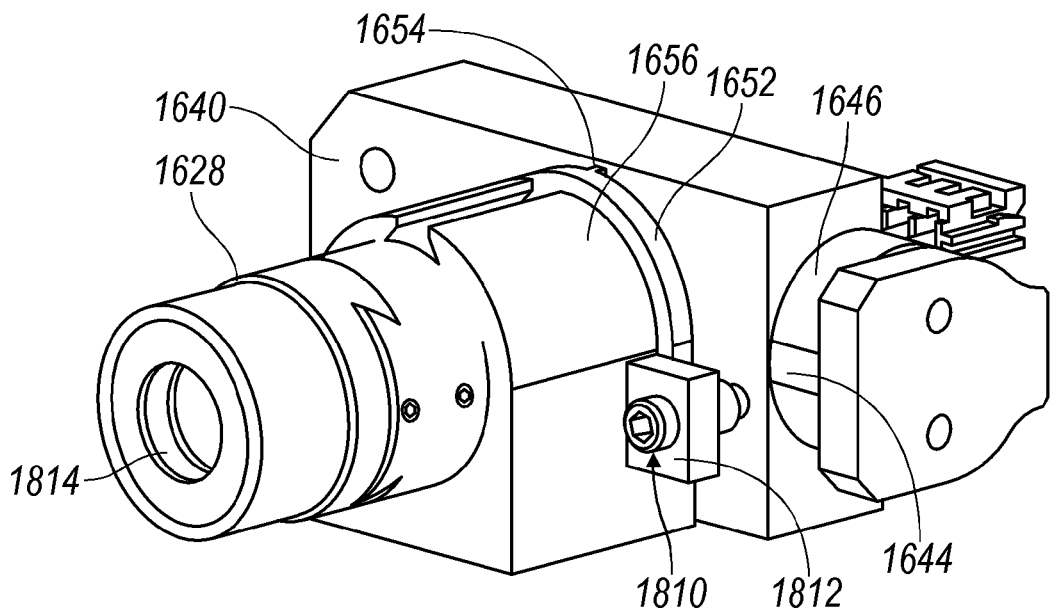
FIG. 18 is a perspective view of another portion of the sensor system in FIG. 16.

Referring now to FIG. 18, the laser source 1628 may include a lens 1814 to focus a laser. In addition, the mounting plate 1640 may be integrally formed with the flex plate 1654, the base 1652, and the reverse clamp 1656. In addition, the reverse clamp 1656 may include a flange 1812 with a threaded bore. A screw 1810 may be inserted through the threaded bore such that turning the screw 1810 relative to the flange 1812 exerts a force on the base 1652. The force bends or flexes the flex plate 1654, adjusting the angle of projection of the laser source 1628.

Figure 19:
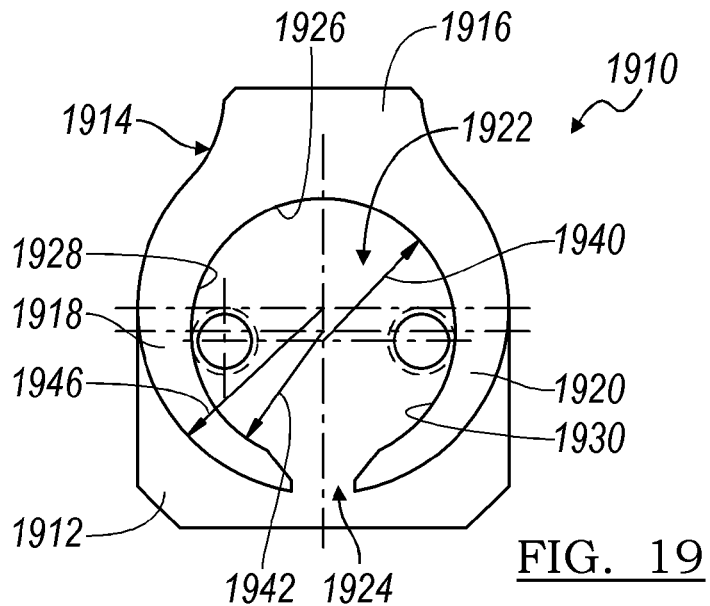
FIG. 19 is a top view of a reverse clamp.
Figure 20:
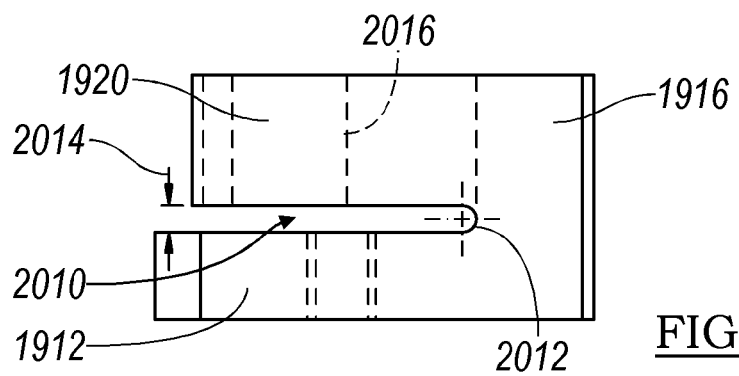
FIG. 20 is a side view of the reverse clamp in FIG. 19.

Now referring to FIGS. 19 and 20, a top view of a reverse clamp is provided. The reverse clamp 1910 may correspond to reverse clamp 1636 and 1646. The reverse clamp 1910 includes a base 1912 and a clamping portion 1914. The base 1912 may include openings for mounting the reverse clamp 1910 to other structures, for example, the sensor structure 1613. The clamping portion 1914 includes a back portion 1916 and two arm portions 1918 and 1920. A gap 1924 may exist between the two arm portions 1918 and 1920. The back portion 1916 has an inner surface 1926 that cooperates with a inner surface 1928 of arm 1918 and inner surface 1930 of arm 1920 to form a generally circular opening. Surface 1926 may have a first radius 1940 that is equivalent to the radius 1942 of surfaces 1928 and 1930. In this example, the origin of radius 1942 is offset relative to the origin of radius 1940 causing an interference fit with a cylinder received into the opening 1922 that has a radius equal to radius 1942 and 1940. As such, if outward pressure is placed on arms 1918 and 1920, both arms 1918 and 1920 will flex causing the opening 1922 to form a circular opening having a radius substantially equal to radius 1940 and 1942 around substantially the entire of the opening 1922. (e.g. except at filets at the center line of the circular opening or at the gap) In this expanded state, a cylinder of a radius equal to 1940 and 1942 may be received into the opening 1922. However, when the force is removed arms 1918 and 1920 will elastically revert causing a constant hoop stress around the cylindrical arm received into opening 1922 by surfaces 1926, 1928 and 1930 cooperatively. The outer surface of the arm 1918 and 1920 is defined by a radius 1946. The thickness of arms 1918 and 1920 change from the gap 1924 to the back portion 1916 as defined by radius 1942 and 1946.

The clamping portion 1914 is separated from the base 1912 by a slot 2010. The width of the slot 2014 may be determined based on the material and stress constraints of the arms 1918 and 1920. The slot 2010 extends from the gap 1924 inwardly towards the back portion 1916 far enough beyond the center line 2016 of the opening 1922 to disipate the stress caused by the force from the flexing arms 1918 and 1920 without fracturing the material of the clamping portion 1914. As such, the end point 2012 of the slot 2010 is located beyond the center line 2016 into the back portion of the 1916. The stress in the arms 1918 and 1920 is focused toward the center line 2016 of the circular opening 1922, when the reverse claim 1910 is in the expanded state to receive the cylindrical arm. Moving the end point 2012 of the slot 2010 into the back portion 1916 allows better dissipation of the stress due to flexing of the arms 1918 and 1920.

By offsetting the radius 1942 of surfaces 1928 and 1930 from radius 1940 of surface 1926 the clamp opens to form a circular geometry the same as the cylinders received into the opening, while maintaining a constant hoop stress completely or nearly completely (e.g. 300-360 degrees) around the received cylinder in its normal state. Due to the construction, the arms 1918 and 1920 are biased to engage the received cylinder with surfaces 1928 and 1930 that match the radius of the received cylinder thereby forcing the cylinder against surface 1926 of the back portion which also has a radius that matches the radius of he cylinder. This unique construction produces a constant hoop stress around the cylinder cooperatively formed by the surfaces 1926, 1928, and 1930. By using the reverse clamping mechanism, the clamping stress is also consistent regardless of the person positioning of the cylinder within the opening of the reverse clamping mechanism. In most clamping mechanisms, positive force is exerted due to a tightening of the clamp. For example, a fastener imarts force on the object being clamped which is subject to a variation in torque from each person clamping the clamping mechanism. In addition, it prevents creeping that can typically occur due to forces imparted on the clamping surfaces as the clamp is tightened. The material of the clamping portion of the reverse clamp may match the material of the cylinder received in the opening. The reverse clamp may be made of various material such as aluminum, titanium, or steel, however, for certain optical sensors 60/61 T6 Aluminum, or 70/75 T6 Aluminum may provide desirable characteristics. Accordingly, the reverse clamp may produce a force of between 200-700 newtons, and for the optical sensors described may be even more desirable in the range of 400-500 newtons.

Figure 21:
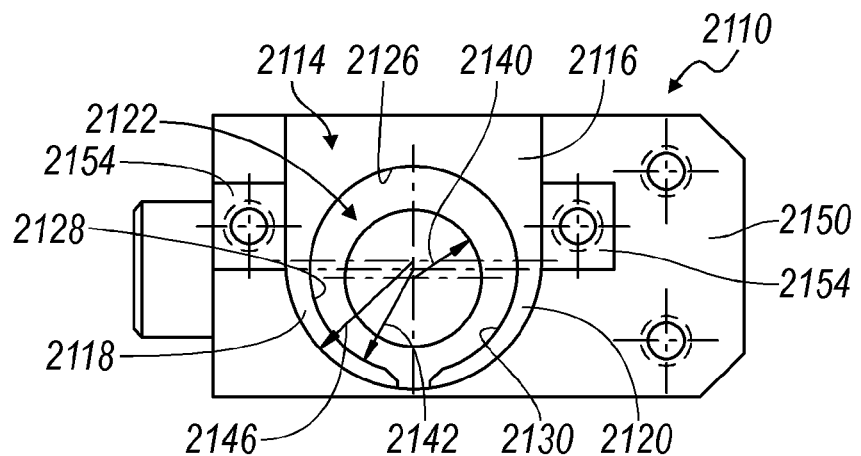
FIG. 21 is a top view of a reverse clamp.
Figure 22:
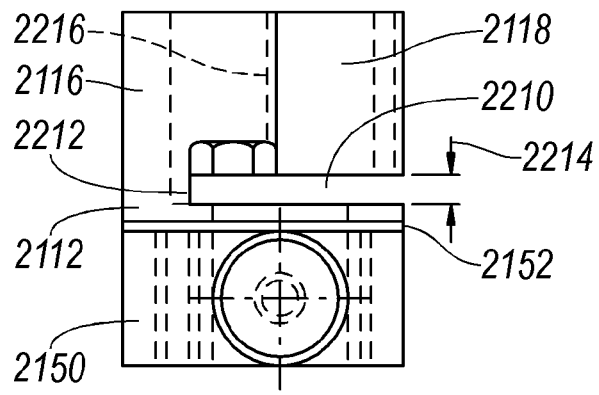
FIG. 22 is a side view of the reverse clamp in FIG. 21.
Figure 23:
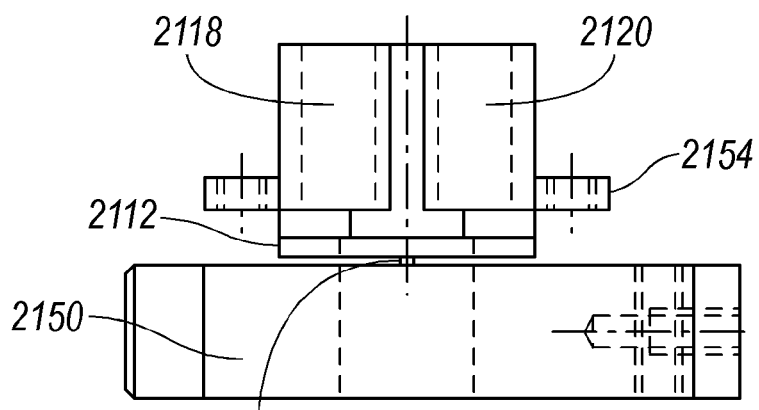
FIG. 23 is a front view of the reverse clamp in FIG. 21.

Now referring to FIGS. 21, 22 and 23, the reverse clamp 2110 may correspond to reverse clamp 1656. The reverse clamp 2110 is attached to a mounting plate 2111 through a flex plate 2152. The reverse clamp 2110 includes a base 2112 and a clamping portion 2114. The clamping portion 2114 includes a back portion 2116 and two arm portions 2118 and 2120. A gap 2124 may exist between the two arm portions 2118 and 2120. The back portion 2116 has an inner surface 2126 that cooperates with an inner surface 2128 of arm 2118 and inner surface 2130 of arm 2120 to form a generally circular opening. Surface 2126 may have a first radius 2140 that is equivalent to the radius of surface 2142 of surface 2128 and 2130. In this example, the origin of radius 2142 is offset relative to radius 2140 causing an interference fit with a cylinder received into the opening 2122 that has a radius equal to radius 2142 and 2140. As such, if outward pressure is placed on arms 2118 and 2120 from within the gap 2142, both arms 2118 and 2120 will flex causing the opening 2122 to form a circular opening having a radius substantially equal to radius 2140 and 2142 around substantially the entire of the opening 2122. (e.g. except at filets at the center line of the circular opening or at the gap) In this expanded state, a cylinder having a radius equal to 2140 and 2142 may be received into the opening 2122. However, when the force is removed arms 2118 and 2120 will elastically revert causing a constant hoop stress around the cylinder received into opening 2122 by surfaces 2126, 2128 and 2130 cooperatively. The outer surface of the arm 2118 and 2120 is defined by a radius 2146. The thickness of the arm 2118 and 2120 may change from the gap 2124 to the back portion 2116 of the clamping portion 2114 as defined by radius 2142 and 2146.

The clamping portion 2114 may be separated from the base 2112 by a slot 2210. The width of the slot 2214 may be determined based on the material and stress constraints of the arms 2118 and 2120. The slot 2210 extends from the gap 2124 inwardly towards the back portion 2116 far enough beyond the center line 2216 of the opening 2122 to disipate the stress caused by the force from the flexing of arms 2118 and 2120 without fracturing the material of the upper portion 2114. As such, the end point 2212 of the slot 2210 is located beyond the center line 2216 into the back portion of the 2116. The stress in the arms 2118 and 2120 is focused toward the center line 2216 of the circular opening 2122, when the reverse claim 2110 is in the expanded state to receive the cylindrical arm. Moving the end point 2212 of the slot 2210 into the back portion 2116 allows better dissipation of the stress due to flexing of the arms 2118 and 2120.

By offsetting the radius 2142 of surfaces 2128 and 2130 from radius 2140 of surface 2126 the clamp opens to form a circular geometry the same as the cylinders received into the opening while maintaining in its normal state a constant hoop stress completely or nearly completely (e.g. 300-360 degrees) around the received cylinder. Due to the construction, the arms 2118 and 2120 are biased to engage the received cylinder with surfaces 2128 and 2130 that match the radius of the received cylinder thereby forcing the cylinder against surface 2126 of the back portion which also has a radius that matches the cylinder. This unique construction produces a constant hoop stress around the cylinder cooperatively formed by the surfaces 2126, 2128, and 2130.

In addition the mounting plate 2150 may be integrally formed with a flex plate 2152 and the reverse clamp 2110. In addition the reverse clamp 2110 may include a flange 2154 with a threaded bore. A screw may be inserted through the threaded bore such that turning the screw relative to the flange 2154 exerts a force on the base 2112 thereby bending or flexing the flex plate 2152 and adjusting the angle of the base 2112 relative to the mounting plate 2150.

Figure 24:
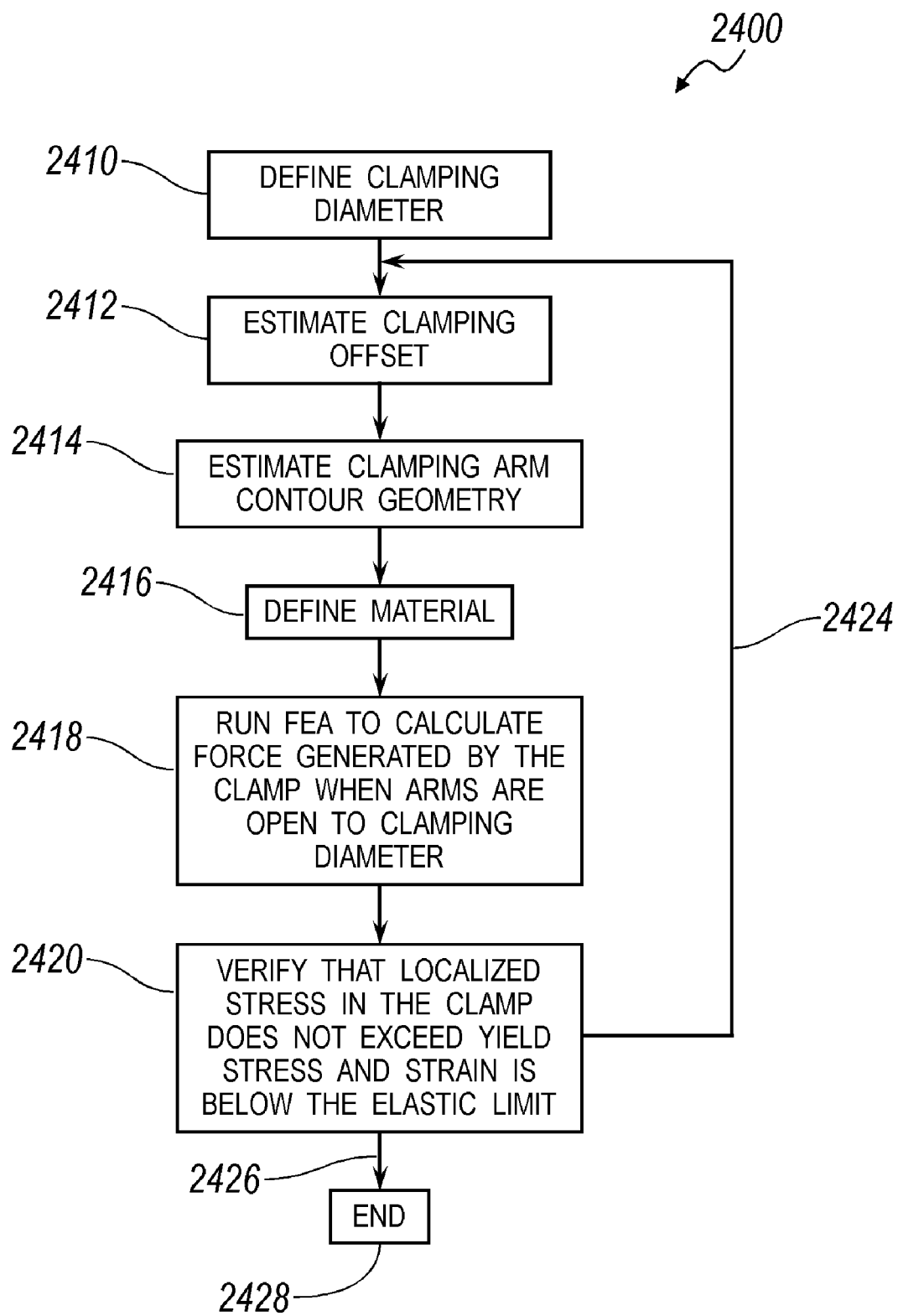
FIG. 24 is a flowchart illustrating a process for generating a reverse clamp.

Now referring to FIG. 24 a process 2400 for generating a reverse clamp is provided. In block 2410, the clamping diameter is defined. In block 2412, the clamping offset is estimated. The clamping offset relates to the eccentricity of the clamping arm diameter and in addition defines the amount of flex each arm will require to form an opening equal to the radius of the cylinder, as well as, the hoop stress imparted on the received cylinder. In block 2414, the clamping arm contour geometry is estimated. In block 2416, the material is defined based on the desired hoop stress and the required flex. The reverse clamp may be formed of aluminum, titanium, or other similar materials. In block 2418, a finite element analysis is performed to calculate the force generated by the clamp when the arms are open to the clamping diameter. Accordingly, the arms may impart a force on the cylinder of between 200-700 newtons. In block 2420, it is determined if the localized stress in the clamp exceeds the yield stress of the material and if the strain is below the elastic limit for the material. If the localized stress is below the yield stress and the strain is below the elastic limit, the method follows line 2426 to block 2428 and the process ends. Alternatively, if the localized stress is not below the yield stress or the strain is not below the elastic limit, the method follows line 2424 to block 2412 where the clamping offset is re-estimated based on the results of the finite element analysis in block 2418.

Further, it should be noted that once the parameters for the reverse clamp have been defined, the reverse clamp may be manufactured according to a unique process. The reverse clamp including the back portion, the first arm, the second arm and the base may be formed from a unitary block of material. The opening may be formed by boring and milling, for example, using a CNC machine. The opening may be formed as described above with respect to FIGS. 19-23. the gap may be formed in the block to produce two arms, for example, by milling into the opening. Then, the outer surface of the arms may be formed by milling and the slot may be cut to form the arms and the base portion. Forming the reverse clamp in this manner provides a high clamping force required for optical applications and a constant hoop stress substantially entirely around the cylindrical arm received within the opening.

Any of the modules, controllers, servers, or engines described may be implemented in one or more computer systems. One exemplary system is provided in FIG. 14. The computer system 1400 includes a processor 1410 for executing instructions such as those described in the methods discussed above. The instructions may be stored in a computer readable medium such as memory 1412 or a storage device 1414, for example a disk drive, CD, or DVD. The computer may include a display controller 1416 responsive to instructions to generate a textual or graphical display on a display device 1418, for example a computer monitor. In addition, the processor 1410 may communicate with a network controller 1420 to communicate data or instructions to other systems, for example other general computer systems. The network controller 1420 may communicate over Ethernet or other known protocols to distribute processing or provide remote axis to information over a variety of network topologies, including local area networks, wide area networks, the internet, or other commonly used network topologies.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Further the methods described herein may be embodied in a computer-readable medium. The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

As a person skilled in the art will readily appreciate, the above description is meant as an illustration of the principles of this invention. This description is not intended to limit the scope or application of this invention in that the invention is susceptible to modification, variation and change, without departing from spirit of this invention, as defined in the following claims.

I claim:

1. A sensor system for analyzing a feature in a sensing volume, the sensor system comprising:
   a mounting structure;
   a light source being attached to the mounting structure, the light sourcebeing configured to project light onto the feature;
   a sensor being attached to the mounting structure through a reverse clamp and acylindrical arm, the reverse clamp including a back portion, a first arm, and a secondarm, the first and second arm extending from the back portion to form an openingconfigured to receive the cylindrical arm, the sensor being configured to image the light where the light intersects with the feature.

2. The sensor system according to claim 1, wherein the lightsource is attached to the mounting structure utilizing a second reverse clamp and asecond cylindrical arm.

3. The sensor system according to claim 2, wherein the lightsource is connected to a mounting plate, the mounting plate being fixed to the mountingstructure through the second reverse clamp and the cylindrical arm, the mounting platebeing connected to the light source through a flex plate to adjust an angle of the light source with respect to the mounting plate.

4. The sensor system according to claim 3, wherein the light source is connected to the mounting plate through a third reverse clamp that engages a housing of the light source, the mounting plate being connected to the third reverse clamp through the flex plate.

5. The sensor system according to claim 1, wherein the sensor is attached to a mounting plate the mounting plate being fixed relative to the mounting structure by a pin, the pin and the cylindrical arm having a common central axis such that the sensor may rotate about the common central axis.

6. The sensor system according to claim 1, wherein the back portion has a first surface configured to engage the cylindrical arm, the first arm having a second surface configured to engage the cylindrical arm, and the second arm having a third surface configured to engage the cylindrical arm.

7. The sensor system according to claim 6, wherein the first, second, and third surfaces cooperate for provide a constant hoop stress around substantially the entire cylindrical arm.

8. The sensor system according to claim 6, wherein the back portion, the first arm, and the second arm form an interference fit between the opening and the cylindrical arm in a resting state.

9. The sensor system according to claim 6, wherein the first surface having a first radius, the second surface having a second radius, the third surface having a third radius, an first origin of the first radius being offset relative to a second origin of the second and third radius.

10. The sensor system according to claim 9, wherein the first, second and third radii are equal.

11. The sensor system according to claim 1, wherein the first arm and the second arm flex such that the opening matches a diameter of the cylindrical arm in a flexed state.

12. The sensor system according to claim 1, wherein the reverse clamp includes a base attached to the back portion, a slot being formed between the base and both the first and second arms.

13. The sensor system according to claim 12, wherein a gap is formed between the first and second arm, the slot extending from the gap toward the back portion, an endpoint of the slot being located beyond a center line of the opening into the back portion.

* * * * *

UNITED STATES PATENT AND TRADEMARK OFFICE
CERTIFICATE OF CORRECTION

| | | |
|---|---|---|
| PATENT NO. | : 7,995,218 B2 | Page 1 of 2 |
| APPLICATION NO. | : 12/796233 | |
| DATED | : August 9, 2011 | |
| INVENTOR(S) | : David Crowther | |

It is certified that error appears in the above-identified patent and that said Letters Patent is hereby corrected as shown below:

In the Claims

In column 14, claim 1, line 43, before "configured to project" replace "sourcebeing" with --source being--.

In column 14, claim 1, line 46, after "reverse clamp and" replace "acylindrical" with --a cylindrical--.

In column 14, claim 1, line 47, after "arm, and a" replace "secondarm," with --second arm,--.

In column 14, claim 1, line 49, after "to form an" replace "openingconfigured" with --opening configured--.

In column 14, claim 2, line 53, before "is attached to the" replace "lightsource" with --light source--.

In column 14, claim 2, line 54, after "reverse clamp and" replace "asecond" with --a second--.

In column 14, claim 3, line 56, before "is connected to a" replace "lightsource" with --light source--.

In column 14, claim 3, line 57, after "being fixed to the" replace "mountingstructure" with --mounting structure--.

In column 14, claim 3, lines 58-59, after "the mounting" replace "platebeing" with --plate being--.

Signed and Sealed this
Fifth Day of June, 2012

David J. Kappos
*Director of the United States Patent and Trademark Office*

CERTIFICATE OF CORRECTION (continued)
U.S. Pat. No. 7,995,218 B2

In the Claims (cont'd)

In column 15, claim 6, line 6, after "cylindrical" replace "arm,the" with --arm, the--.

In column 15, claim 6, line 7, before "arm having" replace "thesecond" with --the second--.

In column 15, claim 7, line 10, before "and third surfaces" replace "first,second," with --first, second,--.

In column 15, claim 7, line 11, before "the entire cylindrical" replace "aroundsubstantially" with --around substantially--.

In column 15, claim 8, line 14, before "the first arm," replace "backportion," with --back portion,--.

In column 15, claim 8, line 15, after "fit between the" replace "openingand" with --opening and--.

In column 15, claim 9, line 18, before "having a first radius," replace "firstsurface" with --first surface--.

In column 16, claim 9, line 1, before "having a third" replace "thirdsurface" with --third surface--.

In column 16, claim 9, line 2, after "being offset relative to" replace "asecond" with --a second--.

In column 16, claim 10, line 5, before "and third radii" replace "first,second" with --first, second--.

In column 16, claim 11, line 8, after "matches a" replace "diameterof" with --diameter of--.

In column 16, claim 12, line 11, before "between the base" replace "beingformed" with --being formed--.

In column 16, claim 13, line 14, before "between the first" replace "isformed" with --is formed--.

In column 16, claim 13, line 16, after "center line of the" replace "openinginto" with --opening into--.